March 1, 1966     D. J. McCARTHY ETAL     3,237,955
KEYLESS CHUCK
Filed Jan. 3, 1964     4 Sheets-Sheet 1
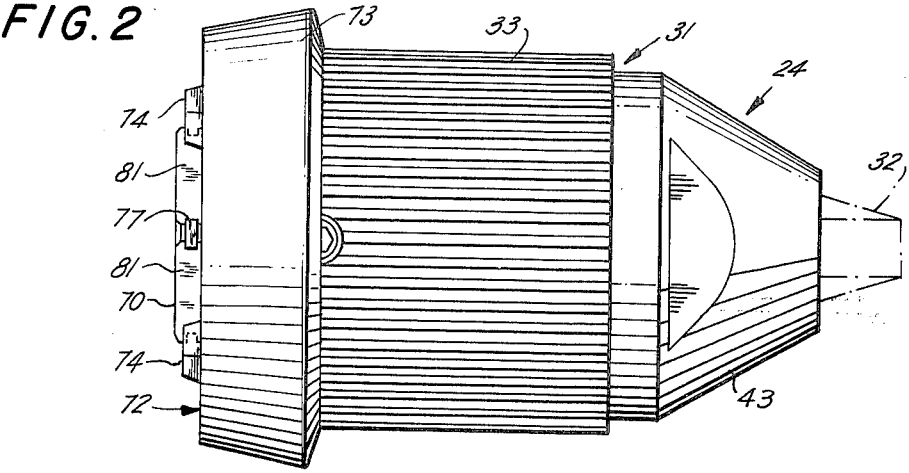
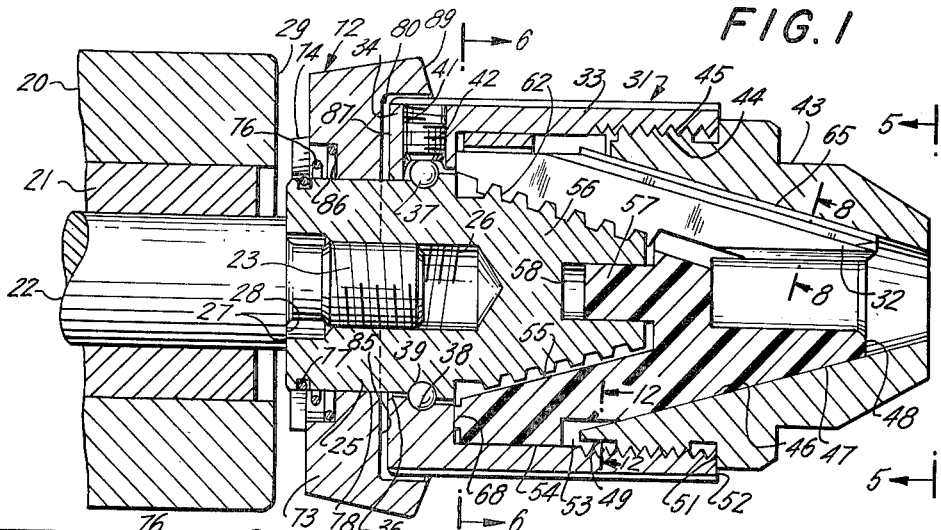
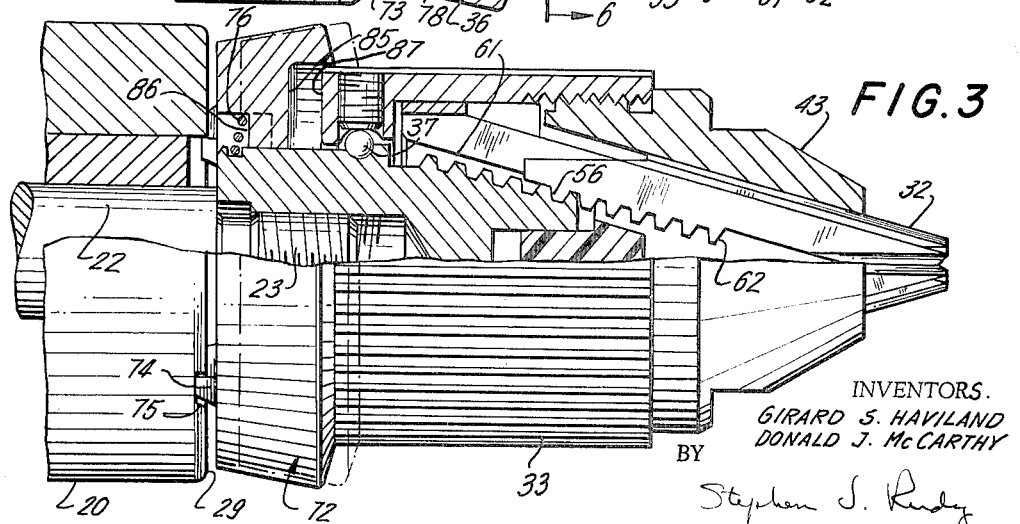
INVENTORS.
GIRARD S. HAVILAND
DONALD J. McCARTHY
BY Stephen J. Rudy
ATTORNEY March 1, 1966  D. J. McCARTHY ETAL  3,237,955
KEYLESS CHUCK
Filed Jan. 3, 1964
4 Sheets-Sheet 2
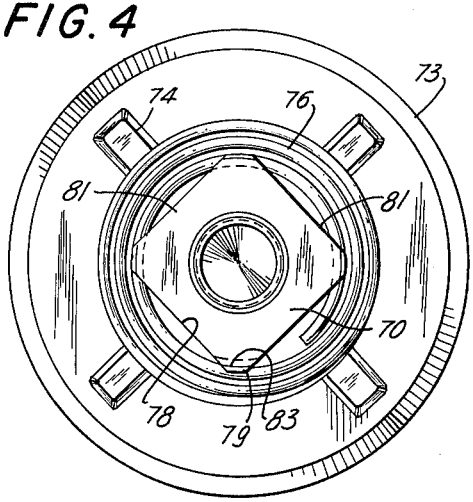
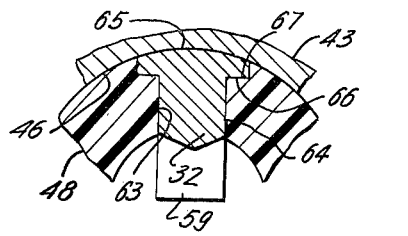
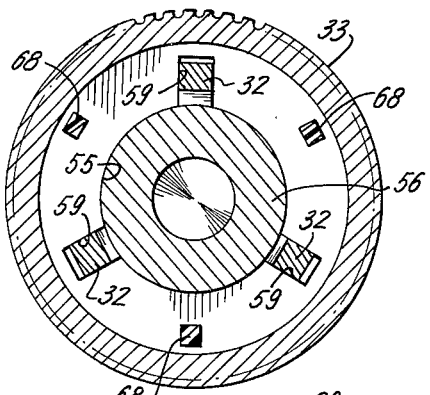
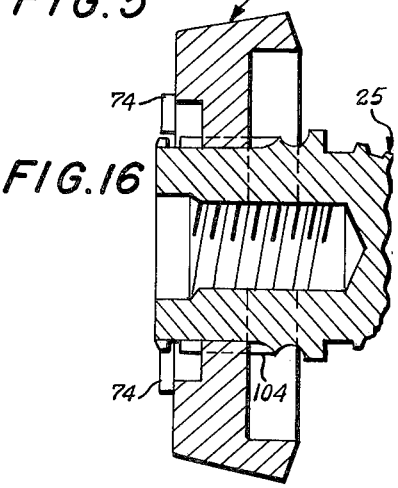
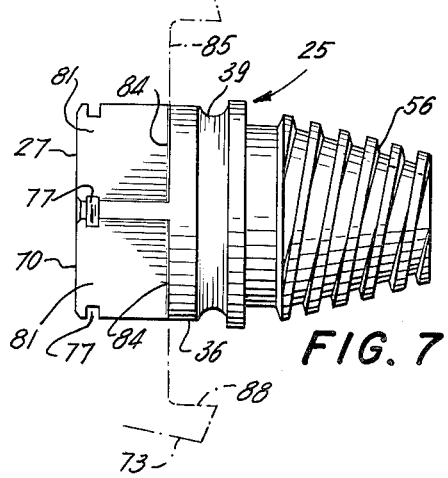
INVENTORS.
GIRARD S. HAVILAND
DONALD J. McCARTHY
BY
Stephen J. Rudy
ATTORNEY March 1, 1966 D. J. McCARTHY ET AL 3,237,955
KEYLESS CHUCK
Filed Jan. 3, 1964 4 Sheets-Sheet 3

INVENTORS.
GIRARD S. HAVILAND
DONALD J. McCARTHY
BY
Stephen J. Rudy
ATTORNEY

March 1, 1966   D. J. McCARTHY ETAL   3,237,955
KEYLESS CHUCK
Filed Jan. 3, 1964   4 Sheets-Sheet 4
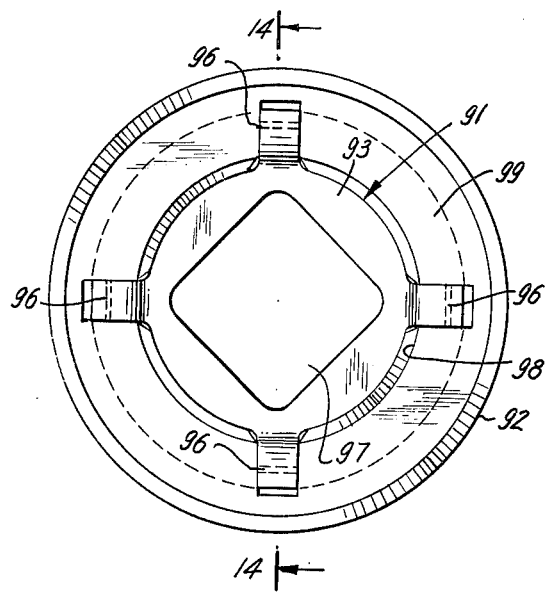
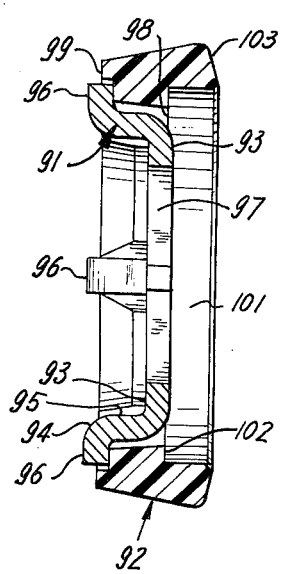
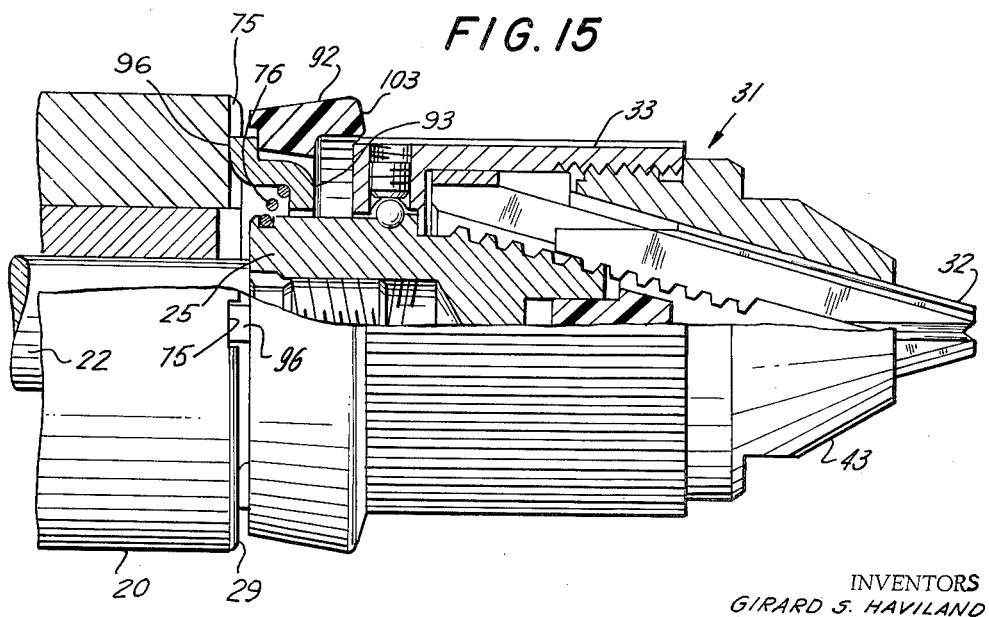
INVENTORS
GIRARD S. HAVILAND
DONALD J. McCARTHY
BY
Stephen J. Rudy
ATTORNEY United States Patent Office 3,237,955
Patented Mar. 1, 1966

3,237,955
KEYLESS CHUCK
Donald J. McCarthy, Wethersfield, and Girard S. Haviland, West Hartford, Conn., assignors to The Jacobs Manufacturing Company, West Hartford, Conn., a corporation of New Jersey
Filed Jan. 3, 1964, Ser. No. 335,482
18 Claims. (Cl. 279—63)

This invention relates to rotary power tools, especially those of the compact type, having a chuck mounted upon a driving spindle which spindle tends to be rotated or carried around by the chuck as the jaws of the latter are being actuated to open or closed condition.

In such tools it is required that the spindle be held stationary while a part of the chuck is being rotated relative to the spindle to effect opening or closing of the jaws of the chuck. Conventionally, this rotation of a part of the chuck relative to the spindle has been accomplished by means of a manipulative key. However, the key actuated chuck has its disadvantages in that the key is subject to being lost, damaged or becoming inoperable.

A general object of this invention is to improve such tools so that the usual key is dispensed with and the actuation of the chuck to open or closed condition is manually done in an easy, efficient, and practical manner.

A feature of the invention is a spindle lock mechanism which is actuable by one hand of the operator to restrain the spindle against rotation, and is of such nature that the operator is enabled to simultaneously use the same hand to rotate a part of the chuck relative to the spindle to effect an opening or closing adjustment of the jaws of the chuck, while holding the housing of the tool stationary in his other hand.

A further feature of this invention lies in the construction of the chuck itself, in which the body of the chuck is attached to the motorized spindle of the tool and another rotatable unit of the chuck is balanced for easy rotation on the body portion. This arrangement facilitates rotation of the jaw actuating unit by one hand of the operator while the same hand is simultaneously actuating the spindle lock mechanism.

A further object of the invention is to provide a practical and efficient manipulative spindle lock for restraining the spindle of a rotary tool against rotation so as to enable relative rotation of a part of the chuck to effect opening or closing adjustment of the jaws of the chuck; and A still further object of the invention is to associate with the spindle lock a chuck having a balanced and lightweight rotatable jaw actuating unit, which enables the spindle lock and the rotatable unit to be simultaneously and easily operated with one hand.

The foregoing and other objects and features of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and they are not to be construed as defining the limits of the invention.

In the accompanying drawings:

FIG. 1 is a longitudinal section through the nose end of a manually portable rotary power tool embodying the invention;

FIG. 2 is a side elevational view of the chuck member detached from the power tool;

FIG. 3 is a side elevational view showing the spindle lock moved to its locking position, and showing the chuck jaws to have been moved from the open condition of FIG. 1 to closed condition;

FIG. 4 is a view of the left or rear end of FIG. 2;

FIG. 5 is a view of the right or front end of FIG. 2;

FIG. 6 is a sectional view taken on line 6—6 of FIG. 1;

FIG. 7 is a detail in side elevation of the screw shaft body of the chuck;

FIG. 8 is a sectional detail taken on line 8—8 of FIG. 1 showing a jaw member seated in a track of the jaw guide member;

FIG. 13 is a rear elevational view of a modified form of the collar;

FIG. 14 is a sectional view taken on line 14—14 of FIG. 13;

FIG. 15 is a view similar to FIG. 3, but showing the modified structure of FIG. 13 in locking position; and FIG. 16 shows the screw body and collar as having a longitudinally splined slidable relation to one another.

Figure 9:
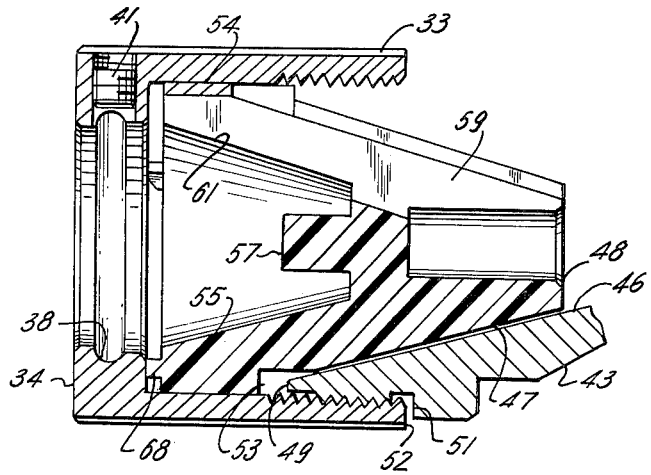
FIG. 9 is a fragmentary longitudinal sectional view showing the relation of the nosepiece to the jaw guide member and the relation of the latter to the sleeve member before the nosepiece has been fully tightened upon the jaw guide.

In the accompanying drawings illustrating the invention there is disclosed in FIG. 1 the nose end of the casing 20 of a portable rotary power tool. The casing, only a fragmentary portion of which is shown, is of conventional configuration adapted to support a spindle 22. The casing has fitted in its nose end a bearing 21 in which the spindle 22 is supported for rotation. The spindle is driven by a rotary motor, not shown, which motor may be either of an electrical or pneumatic type. A threaded end 23 of the spindle projects externally of the casing 20. Threadedly mounted upon this end of the spindle for rotation by the latter is a chuck, generally designated 24. The chuck includes a tapered screw shaft body 25 (FIGS. 1, 7), having an internally threaded axial rear recess 26 in which the end 23 of the spindle is tightly threaded, so that the screw body 25 and spindle 22 rotate as a unit. In this threaded engagement the rear end face 27 of the screw body 25 limits against an annular shoulder 28 of the spindle and is disposed in close relation to the front end face 29 of the casing 20. The screw body 25 can be considered in effect as an extension of the spindle.

Figures 10, 11, 12:
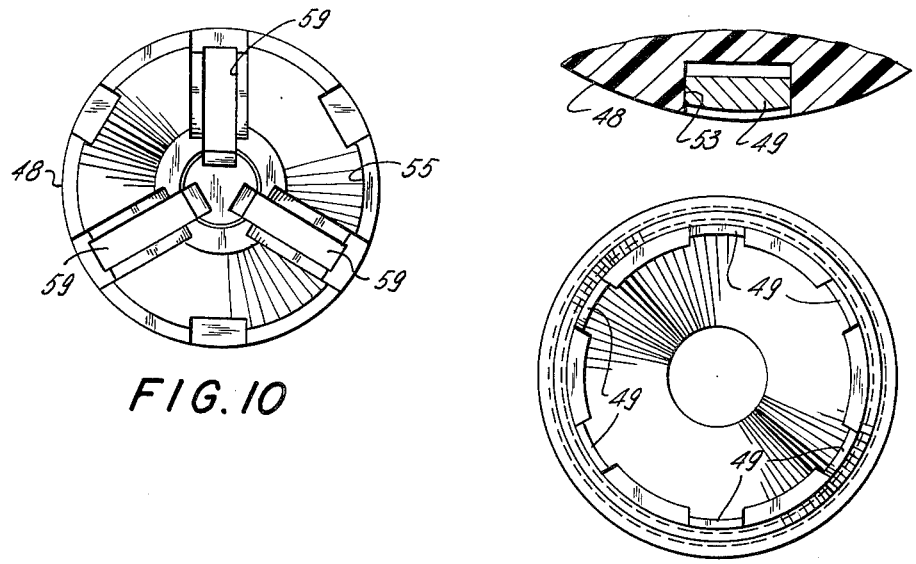
FIG. 10 is a view of the right end of the jaw guide.
FIG. 11 is a view of the left end of the nose piece.
FIG. 12 is a sectional detail taken on line 12—12 of FIG. 1 showing the interlocking relation of the nosepiece with the jaw guide member.

Supported on the screw body for relative rotation is a jaw actuating unit 31. When rotated relative to the screw body, this unit, according to its direction of rotation, causes jaw elements 32 of the chuck to move toward open or closed condition. This unit includes a cylindrical open ended sleeve 33 (FIGS. 1, 9) having an annular thick radial flange 34 at its rear. This flange sleeves with a slight clearance a cylindrical portion 36 formed intermediately of the ends of the screw body. This flanged end of the sleeve is supported upon a ring of ball bearings 37 for rotation relative to the screw body. The bearings are freely rotatable in and fill a raceway defined by a pair of opposed complementary annular grooves 38, 39, one of which is formed in the flange of the sleeve and the other of which is formed in the screw body. A radial hole 41 in the flange 34 communicating with the raceway serves as a means for entering the bearings into the raceway. A set screw 42 serves to confine the bearings to the raceway against escape. An open ended nosepiece 43 has an externally threaded rear portion 44 engaged with internal threads 45 of the sleeve. Extending axially through the nosepiece is a coned opening 46 in which is seated an axial forwardly extending coned portion 47 of a jaw guide member 48. The nosepiece (FIGS. 1, 11) has a plurality of circumferentially spaced rearwardly extending lugs 49, here six in number (FIGS. 1, 12, 11). When the sleeve member 33 is threaded over the rear portion of the nosepiece 43 and the nosepiece is drawn tightly into the sleeve until limited (FIG. 1) by abutment of a shoulder 51 of the nosepiece with the end wall 52 of the sleeve, the lugs 49 are slidably drawn into individual notches 53 (FIGS. 1, 12) formed in a cylindrical rear portion 54 of the jaw guide. This effects an interlocking engagement of the nosepiece and jaw guide (FIGS. 1, 12) whereby the sleeve, nosepiece and jaw guide become rotatable as a unit relative to the screw body 25.

The jaw guide 48 has an axially extending coned recess 55 in its rear. By means of this recess the jaw guide sleeves over and is free to rotate relative to the peripheral surface of a forwardly extending screw formation 56 of the screw body. This screw portion extends beyond the radial flange 34 of the sleeve into the interior of the latter. A cylindrical pilot 57 extending axially from the bottom of the coned recess of the jaw guide extends into an axial bore 58 formed in a truncated front end of the screw body and bears therein for relative rotation. The jaw guide has (FIGS. 6, 8, 9, 10) three inclined or angularly extending tracks or jaw guide slots 59 converging toward each other and spaced equally apart. In each slot is slidably disposed a jaw member 32 for guided movement to open and close condition. These slots open at their rear portions, as at 61 (FIG. 9) into the coned recess 55. Each jaw has along the underside of its rear portion threads 62 which project through the openings 61 into the coned recess 55 and engage with the threads of the tapered screw formation 56.

Rotation of the sleeve member acts through the nosepiece and the jaw guide to carry the jaws 32 rotatably relative to the tapered screw, whereupon the jaws are caused to threadedly ride up or down the tapered screw to open or closed condition, accordingly as the sleeve is rotated in one direction or the other. The fully open and closed conditions of the jaws are shown respectively in FIGS. 1 and 3. The jaws are guided in their movement by means of the elongated slots 59 (FIGS. 8 and 9), the side walls 63 of which bear against opposed flat faces 64 of the jaws. Each jaw is further equipped for guided movement along its related slot by means of an arcuate back portion 65 (FIGS. 1, 8), the arcuate surface of which is exposed through the jaw slot 59 and bears against the internal wall 46 of the nosepiece as the jaw rides along its slot. This back portion overhangs the side faces of the jaw and defines a pair of shoulders 66 which ride upon complementary shoulders 67 of the slots.

The peripheral surface of the sleeve 33 is serrated, as indicated in FIGS. 2, 5 and 6, to enable convenient manual gripping of the sleeve to effect rotation of the rotatable jaw actuating unit 31. The latter unit has a balanced support upon the screw body 25 due to the bearings 37 which support its rear end and due to the pilot bearing 57 which supports its forward end. This balanced support enables easy and smooth rotation of the jaw actuating unit on the screw body with a minimum of friction and with the exertion of a minimum of manual effort. The pilot bearing 57 is of further advantage in that during assembly of the jaw actuating unit it serves to axially center the jaw guide 48 relative to the nosepiece 43. A further construction feature of the jaw actuating unit 31 is its lightweight. This reduces rotational inertia which reduces the tendency of the chuck to open when the spindle is suddenly stopped. It is also a distinct advantage in the lightning of portable tools. This lightweight is effected by forming the jaw guide of lightweight material, such as plastic or aluminum. The plastic construction of the jaw guide also enables a tight and accurately seated relation of the jaw guide in the nosepiece and in the sleeve. To further obtain this accurate axial relation, the jaw guide has a group of equally spaced lugs 68 (FIGS. 1, 6, 9) extending rearwardly from its end wall. In the operation of assembling the rotatable unit, the sleeve 33 is threaded onto the nosepiece, causing the latter to be drawn inwardly. In moving inwardly of the sleeve the interior wall of the coned opening 46 of the nosepiece seats over the coned extension 47 of the jaw guide, and forces the jaw guide rearwardly to abut the end lugs 68 against the flange 34 of the sleeve. As the nosepiece is further tightened and drawn inwardly until an annular shoulder 51 thereof abuts the end wall 52 of the sleeve, the lugs 68 are crushed against the flange 34 and the jaw guide 48 becomes tightly squeezed and seated in the coned opening of the nosepiece 43. The crushable nature of the lugs also serves to compensate for various axial tolerances in the nosepiece, jaw guide and sleeve by enabling the jaw guide to move into the nosepiece to the extent needed to seated condition. The piloted relation of the jaw guide to the chuck body also serves as an aid to accurately position the nosepiece relative to the screw body 25 of the chuck.

When attempting to rotate the jaw actuating unit 31 to obtain a gripping condition of its jaws about a workpiece, or when attempting to release the jaws from gripping condition, there is a tendency, because of the frictional relation of the threads of the jaws to the screw portion 56 of the chuck body, for the spindle and screw body to also rotate. As a consequence, difficulty is experienced in tightening or releasing the jaws relative to the workpiece. This difficulty is avoided in the present invention by means of a manipulative spindle locking mechanism, generally indicated at 72, (FIGS. 1–4).

This spindle locking mechanism includes a manually slidable collar 73 limited to axial sliding movement on a rearwardly extending squared extension 70 of the screw body of the chuck relative to the front end of the casing 20. The collar is manually slidable so as to carry a group of rearwardly extending lugs 74 thereon into locking relation with slots 75 formed in the end face 29 of the casing, whereby rotation of the driving spindle 22 and the associated chuck screw body 25 are restrained. While the collar is manually held in locked relation to the casing the jaw actuating unit may be manually rotated and the jaws thereof caused to be tightened or released from gripping condition. Upon manual release of the collar, a return spring 76 anchored in peripheral grooves 77 of the chuck screw body functions to disengage the collar relative to the casing.

The collar 73, which is shown in FIG. 1 in its normally disengaged condition, has an axial opening 78 (FIG. 4) of general square configuration. The corners 79 of this opening are rounded. The collar slidably sleeves over the external extension 70 of the chuck screw body. The extension 70 has four flat faces 81 corresponding to straight sides of the opening 78 of the collar; and has rounded corners 83 corresponding to the rounded corners 79 of the collar. By this construction the collar has axial movement relative to the chuck screw body, but is restrained against relative rotation. The rounded corners 83 of the extension correspond to the diameter of the cylindrical portion 36 underlying the flange 34 of the sleeve, so that at the forward end of each flat 81 a shoulder 84 appears. This shoulder serves as a stop against which a wall 85 axially recessed in a front face of the collar is limitable in the normal position of the collar (FIGS. 1, 7). The return spring 76 which is of conical coil form has its smallest diameter coil anchored in the peripheral grooves 77 at the rear end of the extension; and it has its largest diameter coil biased against an axially recessed wall 86 in the rear end of the collar. The collar is biased by the spring to its normal position, as in FIG. 1. It is to be noted that the stop shoulders 84 are located slightly rearwardly relative to the rear wall 87 of the sleeve so as to provide a clearance 80 between the collar and the sleeve. This slight clearance is desired so that the rotatable jaw actuating unit 31 may be run up preparatory to final tightening of the jaws, or may be run down subsequent to releasing of the jaws from the workpiece without any frictional restraint of the collar, as might otherwise be the case were the collar to limit, as it is rotated, against the end wall 87 of the sleeve. The collar is provided on its rear face with four of the lugs 74. These are spaced circumferentially 90 degrees apart. Each of the lugs is adapted to slidably seat in a separate slot 75. These slots extend radially in the end face 29 of the casing 20 and are spaced 90 degrees apart.

It is to be noted that the collar has an annular wall extension 88 beyond the recessed wall 85, which freely surrounds the sleeve for a short distance, and also has a thickened inclined end wall 89. The latter aids in the operation of manipulating the collar to locking condition.

The operation of the chuck to open and closed condition relative to a workpiece is facilitated because of the balanced and lightweight construction of the rotatable unit of the chuck and because of the advantageous nature of the locking mechanism.

When the operator desires to adjust the jaws to open or closed condition, he grips the sleeve member 33 with his hand while simultaneously sliding his hand endwise against the collar inclined end wall 89 so that if the spindle 22 tends to rotate as the operator applies a twist to sleeve 33, the lugs 74 on the spindle lock mechanism 72 will engage the slots 75 of the stationary casing 20, thus locking the spindle stationary so that a torque equivalent to a full handed grip on sleeve 33 can be applied to open or close the jaws. Upon the operator's moving his hand away from the collar the latter is returned by the spring 76 to its normal position. On a portable tool, the one handed operation is very important because the tool casing 20 will usually be held in the other hand. Previously, keyless chuck construction required that the tapered screw body be restrained by one hand while the actuating mechanism was turned with the other. Obviously, on the usual sizes of chucks this resulted in finger tightening rather than full grip tightening because of space limitations with a result that the applied torque on the chuck mechanism was one-half or less of that possible on applicants' device. It was also much slower to shift hands around and simultaneously hold the weight of a portable tool.

The distance over which the collar is required to slide so as to engage the lugs 74 in the slots 75 is slight. It is relatively shorter than the width of the operator's hand, so that all of his hand is enabled to grip the sleeve to effect rotation of the jaw actuating unit. Further, the inclined end wall 89 of the collar is smooth and free of sharp edges. This enables the edge of the operator's hand to easily ride against the face of this wall as his hand rotates the jaw actuating unit.

The collar 73 disclosed in FIG. 1 is formed of all metal. It may, however, be formed partly of metal and partly of some lighter and less expensive material, such as plastics. In FIGS. 13–15 a modified structure of the collar is shown, wherein a metal insert 91, which serves in part the functions of the lugs 74 also serves to slidably support the collar on the chuck body, is embodied in a plastic collar body 92.

The metal insert has a flat annular bottom plate 93 from the periphery of which extend four lugs 94 located 90 degrees apart. Each lug includes an arm portion 95 which is offset at right angles to the plate 93, and further includes a locking ear 96 which is offset outwardly at right angles to the arm. Axially of the insert is a squared opening 97 corresponding to the opening 78 of the collar in FIGS. 1 and 4, and serving the same function relative to the extended portion 70 of the chuck screw body. The insert 91 is seated fast in a rear annular recess 98 of the collar body. In its seated condition each of the arms 95 is seated tightly in a complementary groove of the collar. Each of the locking ears 96 is tightly seated in part in a radial groove formed in the end face 99 of the collar body, in such manner that a portion of the ear projects rearwardly beyond the end face 99 of the collar. These ears serve the purpose of the lugs 74, as indicated in FIG. 15, wherein the ears are shown in locking engagement with the radial slots 75 of the casing 20 of the tool. The major diameter coil of the return spring 78 anchored on the extension 70 of the screw body presses against the bottom plate 93 of the insert. An annular recess 101 in the front end of the collar body provides an annular wall 102 which corresponds in function to the annular wall 85 of the collar shown in FIG. 1. The inclined wall 103 of the modified form corresponds to the end wall 89 of the collar of FIGS. 1 and 7. The bottom plate 93 of the insert is exposed at the bottom of the annular recess 101. This exposed part is adapted to limit against shoulders of the chuck screw body corresponding to the shoulders 84 shown in FIG. 7, under the bias of the return spring in the normal unlocked condition of the collar.

In FIG. 16, the screw body 25 and the collar 73 are shown as having a longitudinally splined slidable relation to one another, as indicated at 104.

While the invention has been illustrated and described in detail, it is to be expressly understood that the invention is not limited thereto. Various changes can be made in the design and arrangement of the parts without departing from the spirit and scope of the invention as the same will now be understood by those skilled in the art; and it is our intent, therefore, to claim the invention not only as shown and described herein but also in all such forms and modifications as may be reasonably construed to fall within the spirit of the invention and the scope of the appended claims.

What is claimed is:

1. In a rotary tool including a stationary casing having an end face at its front end, a driving spindle rotatably supported in the casing having a short end projecting through the front end of the casing, and a chuck having a shaft body mounted fast to the projecting end of the spindle and having a chuck jaw actuating unit manually rotatable on the shaft body, lock engageable means on the end face of the casing, and locking means restrained against relative rotation on the shaft body rearwardly of the jaw actuating unit having axial sliding movement along the shaft body so as to obtain a locking engagement with the lock engageable means to lock the shaft body against rotation relative to the casing.

2. In a rotary power tool as in claim 1, wherein the shaft body has a squared extension projecting rearwardly of the jaw actuating unit, and the locking means includes a collar having an axial complementary squared opening sleeving the squared extension.

3. In a rotary power tool as in claim 2, wherein the collar has a plurality of rearwardly extending lugs and the end face of the casing has a plurality of slots each engageable by one of the lugs to effect locking engagement of the collar and casing.

4. In a rotary power tool as in claim 2, wherein the extension is shouldered at its inner end, the collar has a front end limitable against the shouldered end, a spring anchored on the shaft yieldably biases the collar to limit against the shouldered end, and a clearance is provided between the collar and the jaw actuating unit so as to permit rotation of the jaw actuating unit clear of the collar.

5. In a rotary power tool as in claim 4, wherein the collar is manually slidable along the extension into said locking engagement with the casing over a relatively short distance substantially less than the width of the hand, and the collar is of greater diameter than the jaw actuating unit so as to project radially beyond the latter, whereby the collar may be abutted and slidably forced by an edge of the hand into and held in locked engagement with the casing while the remaining portion of the hand simultaneously manipulates the jaw actuating unit.

6. In a rotary power tool as in claim 3, wherein the axial squared opening of the collar is formed axially of a metal insert of the collar and the lugs are defined by offset portions of the insert projecting rearwardly of the collar.

7. In a rotary power tool as in claim 5, wherein the collar has a forwardly projecting annular wall freely surrounding a marginal rear portion of the jaw actuating unit, which wall has an annular front face adapted for abutment by an edge of the hand for sliding the collar.

8. In a rotary power tool as in claim 5, wherein the jaw actuating unit is supported by means of a pair of spaced bearing elements for balanced rotation on the shaft body.

9. In a rotary tool as in claim 8, wherein one of the bearing elements is defined by a ring of ball bearings in a raceway defined in part by an annular groove of the shaft body and in part by an opposed annular groove of the jaw actuating unit; and the other bearing element is a pilot bearing defined in part by an axial pilot hole in the front end of the shaft body and in another part by a pilot portion of the jaw actuating unit bearing in the pilot hole.

10. In a rotary power tool as in claim 9, wherein a moulded jaw guide serves as a lightweight core of the jaw actuating unit in surrounding concentric relation to the shaft body and carries the pilot portion axially thereof to provide accurate concentricity of the jaw actuating unit with the shaft body.

11. The combination in a rotary power tool of a manually grippable casing, a driving spindle rotatably supported in the casing having an end projecting beyond the casing, a chuck having a shaft body drivingly connected to the spindle and having a jaw actuating unit rotatable on the shaft body, and spindle lock means restrained on the shaft body for rotation therewith and axially slidable on the shaft body from a normal position rearwardly of the jaw actuating unit to a locking position with the casing restraining the shaft body against relative rotation.

12. In a chuck including a shaft body, a jaw actuating unit mounted upon a forward end of the body having relative rotation and tending to rotate the body with it, the body having an extension projecting rearwardly and externally of the jaw actuating unit attachable to a driving spindle, a latchable collar mounted upon the extension of the body part from the jaw actuating unit having axial movement along the extension relative to the jaw actuating unit and being restrained on the extension against relative rotation.

13. In a chuck including a driving shaft body, a jaw actuating unit mounted upon a forward end of the body having relative rotation and tending to rotate the body with it, the body having an extension projecting rearwardly and externally of the jaw actuating unit, and a latch engageable collar mounted on the extension apart from the jaw actuating unit having axial slidable movement along the extension and being restrained thereon against relative rotation.

14. In the combination of a non-rotatable support having lock engageable means thereon, and a chuck comprising a driving spindle rotatably carried by the support and a jaw actuating unit supported on the spindle for relative rotation under manual power, a spindle lock for restraining the spindle against rotation while the jaw actuating unit is being manually rotated, the spindle lock comprising a manually slidable collar limited to axial movement along the spindle rearwardly of the jaw actuating unit, and means on the collar movable into locking engagement with the lock engageable means of the non-rotatable support upon moving the collar a predetermined distance along the spindle.

15. Spindle locking means for locking against rotation the spindle of a tool having a chuck provided with a rotative jaw actuating unit so as to enable the jaw actuating unit to be manually rotated relative to the spindle, comprising a casing support for the spindle having lock engaging means in an end thereof, a collar restrained on the spindle for rotation together with the latter and having axial sliding movement along the spindle toward and away from the end of the casing, and means on the collar engageable with the lock engaging means of the casing for locking the collar and as a consequence the spindle against rotation relative to the casing upon sliding the collar a predetermined distance toward the casing.

16. Spindle locking means for a rotary power tool for locking the driving spindle against rotation relative to the casing of the tool, comprising lock engaging means on an end of the casing, and a collar manually slidable along the spindle and restrained on the spindle for rotation with the latter having means engageable with the lock engaging means of the casing to lock the collar and as a consequence the spindle against rotation relative to the casing upon sliding the collar toward the said end of the casing of the tool.

17. A combined chuck and spindle lock mechanism comprising a shaft body adapted for driving attachment to a spindle having a stationary support, a jaw actuating unit having rotation on a forward portion of the shaft body for jaw actuation to open and closed condition, and a latching collar latchable to the support mounted on the shaft body apart from the jaw actuating unit, the collar being axially slidable on the shaft body and restrained thereon against relative rotation.

18. In a rotary tool as in claim 1, wherein the shaft body has a splined extension projecting rearwardly of the jaw actuating unit, and the locking means includes a collar having an axial complementary splined opening sleeving the splined extension.

References Cited by the Examiner

UNITED STATES PATENTS

| | | | |
|---|---|---|---|
| 1,630,259 | 5/1927 | Englund | 279—1 |
| 1,668,317 | 5/1928 | Hubbell | 279—63 |
| 2,075,031 | 3/1937 | Emrick | 279—63 |
| 2,872,197 | 2/1959 | Happe | 279—1 |

ROBERT C. RIORDON, *Primary Examiner.*